March 20, 1962 — A. V. KLANCNIK — 3,025,838
MACHINE TOOLS

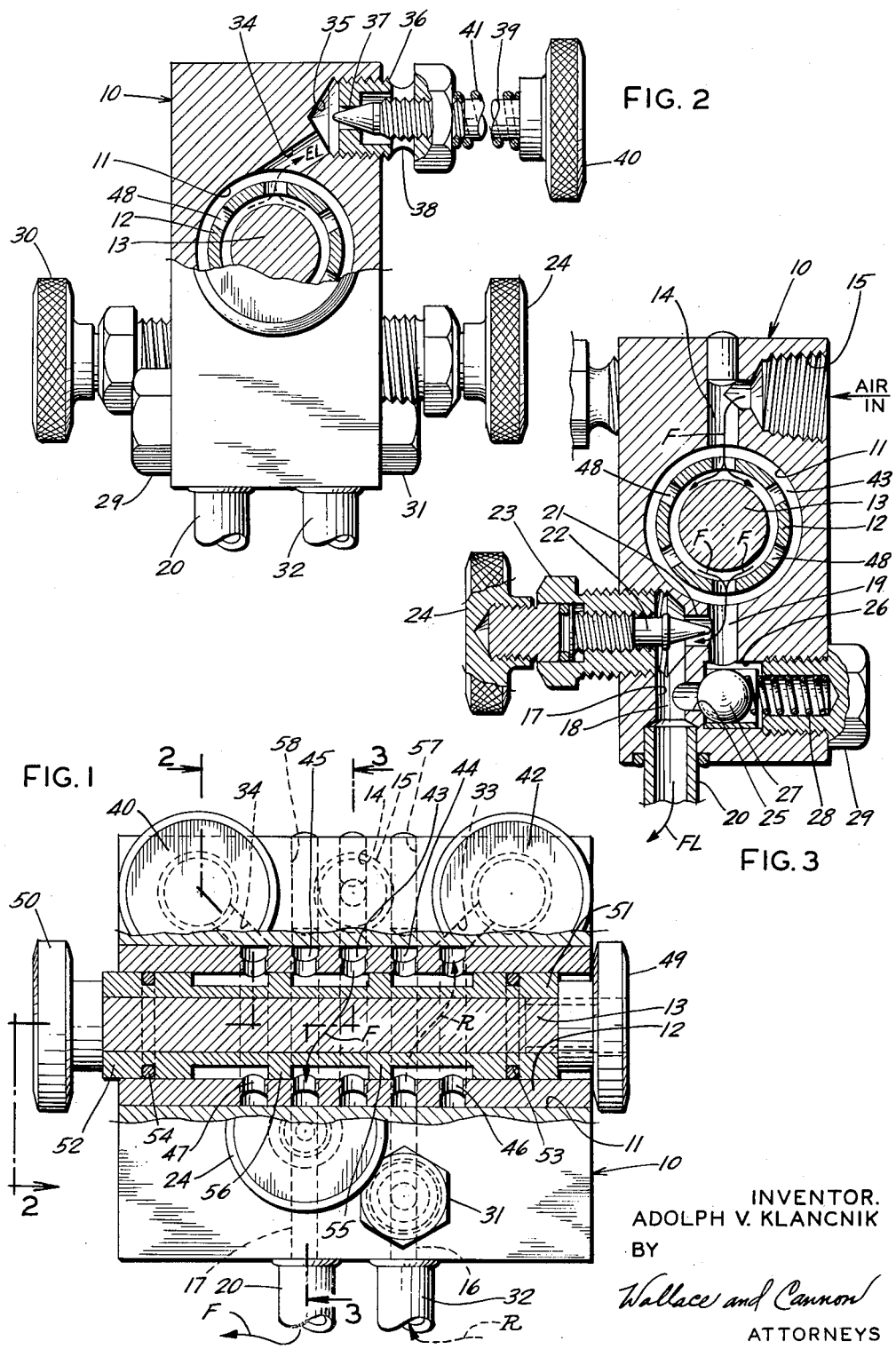

Filed Nov. 17, 1958 — 2 Sheets-Sheet 2

INVENTOR.
ADOLPH V. KLANCNIK
BY
Wallace and Cannon
ATTORNEYS

United States Patent Office 3,025,838
Patented Mar. 20, 1962

3,025,838
MACHINE TOOLS
Adolph V. Klancnik, 1020 Glenview Road, Glenview, Ill.
Filed Nov. 17, 1958, Ser. No. 774,258
9 Claims. (Cl. 121—45)

This invention relates to machine tools and in particular to the construction of a four-way solenoid control valve for controlling the forward and reverse strokes of a drill or the like included in the machine tool.

It is common practice to establish forward and reverse strokes of a drill in a machine tool by having resort to a four-way valve which controls the direction of fluid under pressure used to advance or retract piston means which operate the head of the tool carrying the drill.

There are numerous situations arising under use of tools of the kind described above wherein it would be advantageous to be able to account for different modes of operation insofar as the speed of forward and reverse strokes of the tool is concerned. This will depend for the most part upon the nature of the work piece being turned out by the tool. For instance, circumstances may be such where the most precise kind of drilling, tapping, turning or like machine tool operations will be accounted for by a rapid unimpeded advance of the tool relative to the work piece with rapid unimpeded withdrawal. On the other hand, it may be important under other circumstances to drive the tool slowly forward with steady pressure on the back side of the piston and with an impeding slow exhaust of fluid on the forward side of the piston. In other machining operations it may be desirable to have a fast forward stroke and a slow return stroke or a slow forward stroke with a rapid return. The achievement of these diverse modes of operation through the medium of a single four-way valve is the primary object of the present invention.

Specifically it is the object of the present invention to accomplish the foregoing by including in a four-way valve a plurality of adjustable needle valves and a plurality of check valves related one to another in an uncomplicated and inexpensive construction and in such a manner as to enable virtually infinite adjustments and regulations to be made relative to the speed of forward and reverse strokes of the mounting head which carries a rotating drill-type tool in a machine tool.

Other and further objects of the present invention will be apparent from the following description and claims and are illustrated in the accompanying drawings which, by way of illustration, show a preferred embodiment of the present invention and the principle thereof and what is now considered to be the best mode contemplated for applying this principle. Other embodiments of the invention embodying the same or equivalent principle may be used and structural changes may be made as desired by those skilled in the art without departing from the present invention.

In the drawings:

FIG. 1 is a side view, with certain parts in section for purposes of clarity, of the valve of the present invention;

FIG. 2 is an end view of the valve of FIG. 1 with certain parts being shown in section as taken on the section lines 2—2 of FIG. 1;

FIG. 3 is a sectional view of the valve of FIG. 1 taken on the section lines 3—3 of FIG. 1;

Figure 6:
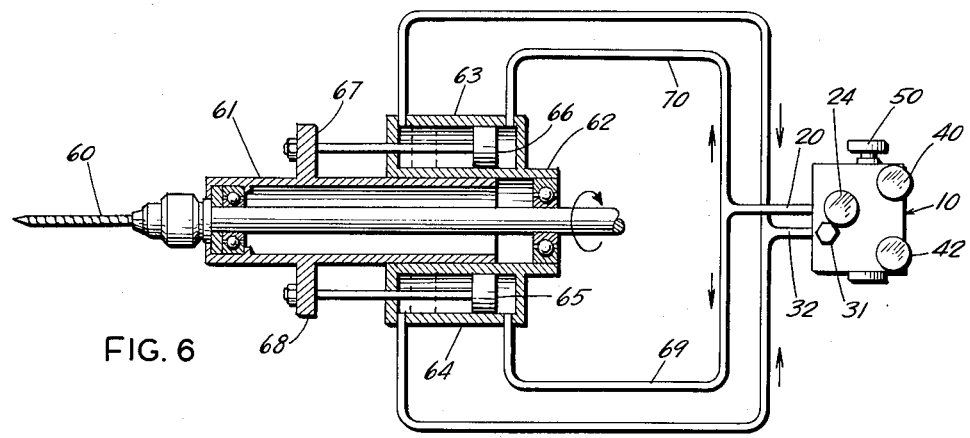
FIG. 6 is a schematic illustration of the valve as in operative relation to a fluid motor controlled machine tool.

The valve of the present invention is illustrated in FIG. 1 as including a main body portion defined by a mounting block 10 having a bore 11 of circular cross section extending therethrough. A mounting sleeve 12 is tightly fitted in the bore as by a press fit and serves as a guiding support for a valve controlling spool 13 which is slidably mounted therein. The spool acts as the armature for a pair of actuating solenoids (not shown) in a manner such that when one solenoid is energized the spool moves to one position as illustrated in FIG. 1 and when the other solenoid is energized the spool moves to another position as is represented in FIG. 4, such movement being for purposes to be pointed out more fully hereinafter.

A fluid inlet passage 14 extends radially with respect to the bore and opens into the bore. A pipe threaded port 15 extends at right angles to the passage 14 to afford a convenient means for coupling a conduit to the block, such conduit being adapted to deliver air or other fluid under pressure from a suitable source, such as a compressor or accumulator to the passage 14.

Figure 4:
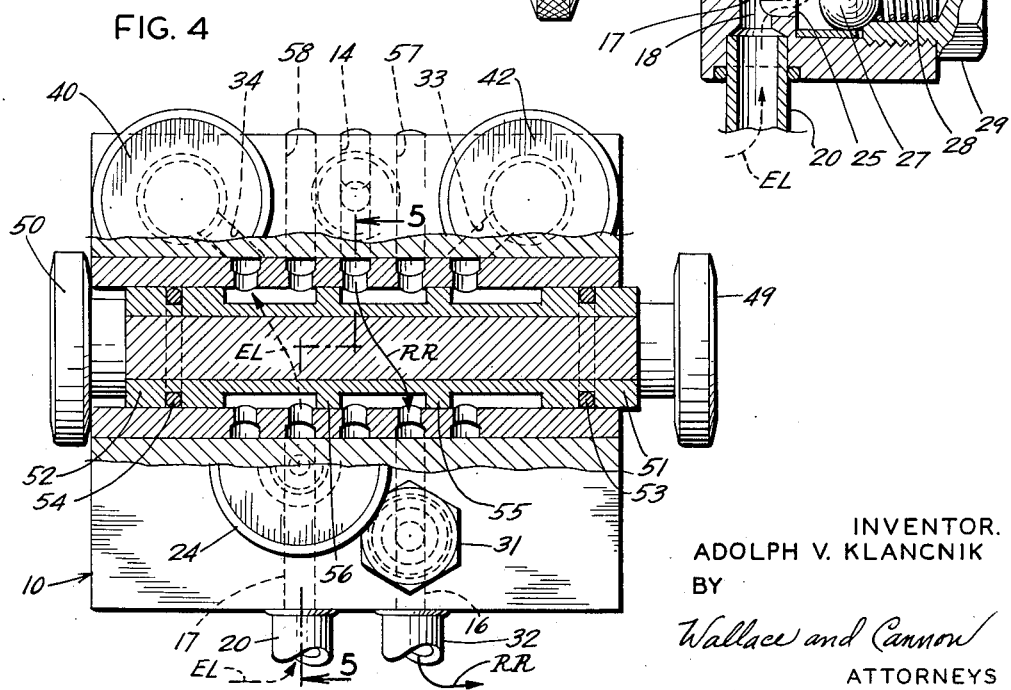
FIG. 4 is a sectional illustration similar to FIG. 1 but illustrating a different operative position of the elements shown in FIG. 1.

A pair of passages 16 and 17 are formed in the block on the opposite side of the bore 11 from the passage 14 and are positioned on opposite sides of the passage 14 as is seen best in FIGS. 1 and 4. Each of the passages 16 and 17 is identically formed and for this reason only the passage 17 will be described in detail. Thus, as will be seen best in FIGS. 3 and 5, the passage 17 includes a first portion 18 leading outwardly through the valve body and offset with respect to the axis of the bore 11, and a second portion 19 extending parallel to the portion 18 and radially with respect to the bore. A conduit 20 is fitted to the block in position to deliver air to and from the passage 18. A cross passage 21 extends between the portions 18 and 19 near the bore 11.

In order to vary the outlet area of the cross passage 21, a needle valve 22 extends into the portion 21. Needle valve 22 is threadably mounted in a plug 23 threaded into the valve block so that by rotating the knob 24, the needle point moves toward and away from the portion 21. Thus the operator, by rotating the knob, may set the needle valve at a desired position and select the amount of pressure delivered as a forward flow to the conduit 20.

Figure 5:
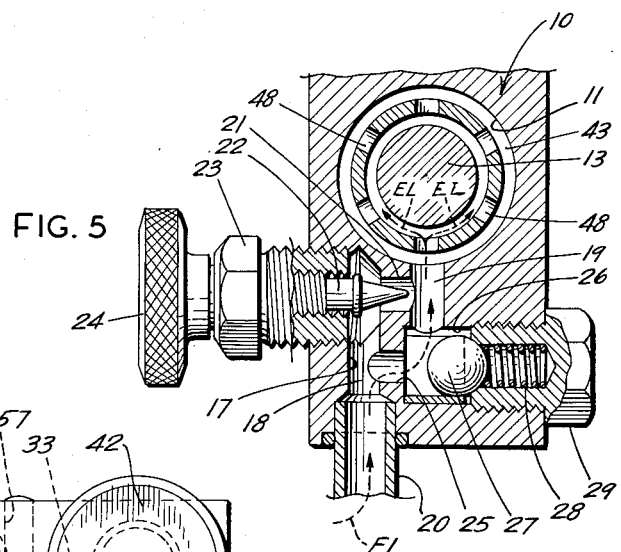
FIG. 5 is an end view of the valve as shown in FIG. 4 with certain parts being shown in section as taken on the section lines 5—5 of FIG. 4.

The passage 17 has a bypass associated therewith in a manner to circumvent the restricting action of the needle valve when the operating fluid is flowing along a return path from the conduit 20 toward the bore, while being inoperative when fluid is delivered through passages 19—21—18 to the conduit 20. The bypass includes an orifice 25 which opens at one end into passage 18 and at the other end opens into a chamber or bore 26. The passage portion 19 extends past the cross passage 21 and into the bore 26. A ball check valve 27 is positioned in the bore or chamber 26 and is adapted to seat in closing relation against the orifice 25. A spring 28 which is supported by a plug 29 threaded into the valve block 10 biases the ball into closing relation to the orifice 25. The spring 28 provides a relatively light biasing action so as not to materially resist the opening of the ball from the orifice (as seen in FIG. 5) when air is returned from the conduit 20.

The area of the orifice 25 should be greater than the flow area past the needle valve 22 when the needle valve is in its position of minimum resistance or restriction so that the ball opens readily upon a return flow of air to by-pass the needle valve 22. When air is delivered to the conduit 20 from the passage 17, the air pressure from the passage portion 19 will assist in holding the ball closed upon its orifice (as seen in FIG. 3).

The passage 16, FIG. 1, similarly includes offset portions, a cross-over portion and a bypass. The needle valve operating knob for passage 16 is shown at 30, FIG. 2, and the check valve plug is shown at 31, FIG. 1. Passage 16 is adapted to convey air to and from a conduit 32 which leads to the fluid motor as will be explained with the same regulating conditions explained in connection with the passage 17.

The valve body has a pair of exhaust passages therein on the same side of the bore 11 as the inlet passage 15. The exhaust passages 33 and 34 are spaced outwardly from the passages 16 and 17. Exhaust passage 33 is adapted to exhaust fluid returned from conduit 32 and passage 16, while exhaust passage 34 is adapted to exhaust fluid returned from conduit 20 and passage 17. Passage 33 is inclined outwardly toward the end of the block and toward the side of the block opposite to the side of the block having the inlet 15 and from a point on the bore 11 axially spaced outwardly from the passage 16. Passage 34 is also inclined outwardly toward the same side but at the opposite end of the block and from a point on the bore spaced axially outwardly from the passage 17.

Each exhaust passage has similar restrictable means associated therewith. Such means for the passage 34 appears in detail in FIG. 2 wherein it will be noted that passage 34 opens into a bore 35 formed in the side of the block. A plug 36 is threaded into the bore 35 and has an orifice 37 leading to exhaust ports 38. A needle valve 39 extends coaxially with the plug and is threadedly carried thereby so that by rotating the needle valve, the conic nose of the valve is moved into and out of the orifice 37. The needle valve 39 may have an operating knob 40 at the outer end thereof and may have a spring 41 exerting a slight outward biasing force on the knob.

The operating knob 42, FIGS. 1 and 4, for the restrictable means associated with the passage 33 is similar in structure and function to the restrictable means for passage 34.

The sleeve 12, FIG. 1, has a plurality of axially spaced grooves on the outer surface thereof and extending circumferentially thereof. The middle one of these grooves 43 is axially aligned with the passage 14 with spaced pairs of grooves on each side thereof. The inboard ones of each pair of grooves, as for example, grooves 44 and 45, are axially aligned with the portions of passages 16 and 17 leading to the sleeve and are in communication therewith. The outboard grooves 46 and 47 of each pair are axially aligned with the inner ends of passages 33 and 34 and are in communication therewith.

In order to allow generous passage of air between the grooves and the interior of the sleeve 12, a plurality of openings 48, FIG. 3, are tapped through the body of the sleeve and through the inner wall of each groove.

The valve operating spool 13 has a stop at each end thereof, as at 49 and 50 so that as the spool is shifted back and forth between the positions illustrated in FIG. 1 and FIG. 4, one stop or the other abuts against the end of the valve block and limits further movement. The spool has end collars 51 and 52 provided with O-rings 53 and 54 so as to form a fluid-tight seal at each end of the sleeve 12. The spool has spaced separator rings or lands 55 and 56 which are spaced from one another by a distance slightly greater than the distance embraced by two adjacent rows of apertures 48 through the sleeve and similarly spaced from the end collars. Each separator ring has a thickness slightly less than the distance between adjacent rows of apertures or tapped openings 48 in the sleeve.

If desired, the lands defining the end collars and separator rings may be formed on a separate sleeve which fits over a central shaft portion of the spool 13. This construction is apparent to FIG. 1.

In order to properly align the grooves in the sleeve 12 with the inlet passage 14, the delivery passages 16 and 17, and the exhaust passages 33 and 34, three guide holes are drilled into the valve block 10 and sleeve 12 before the circular grooves as 43 and 44 are formed in the sleeve. To attain this, the sleeve 12 is first positioned accurately in the bore of the valve block and the passage 14 is drilled into the block, through one wall of the sleeve, and into the opposite side of the sleeve wall to a point generally coincidental with the location of the inner surface of the middle groove 43 which is later formed. Such drilling really accounts for two of the apertures that are associated with the middle groove 43. Two additional holes are drilled through the block on opposite sides of the hole or passage 14 and parallel thereto. These additional holes 57 and 58, FIG. 1, are spaced in accordance with the desired spatial relation of the radially extending portions of the passages 16 and 17 and drilled through the sleeve and into the block on the other side of the bore to a depth sufficient to open into the bypass bores 26.

The sleeve is then removed and grooves 43, 44 and 45 are machined in the sleeve at positions corresponding to the positions of the holes in the sleeve. The two outer grooves 46 and 47 are then located with respect to the other grooves. What additional apertures as 48 are desired are then tapped into the sleeve at the groove locations and through the inner walls of the grooves so as to define adequate space for the flow of air through the sleeve.

The bores for the needle valves and check valves may then be formed in the block and the exhaust passages 33 and 34 formed therein. It should be noted that the exhaust passages are angularly disposed in such a way that a drill may be inserted into the bores 35 as to form these passages. In other words, the axes of the passages 33 and 34 extend through the open space of the bores 35 so that the linear movement of the drill produces the passages. The sleeve 12 is then press fitted back into the bore 11 and the needle valve and check valve assemblies positioned in operative relation to their associated passages. The outer ends of the holes 57 and 58 and the hole for passage 14 are plugged as shown in FIG. 1 so as to preclude passage of air through the outer ends of these holes.

FIG. 6 illustrates the valve in operative relation to a reciprocating machine tool 60 in the form of a drill. The support 61, in which the tool is rotatably supported, is mounted for sliding to-and-fro movement in a guide 62. A pair of fluid motors 63 and 64 have pistons 65 and 66 which are connected through piston rods to spider arms 67 and 68 on the support 61. The conduit 20 may have branch lines 69 and 70 adapted to establish communication between the valve and the right hand ends of the motors 63 and 64. The conduit 32 may have branch lines adapted to establish communication between the conduit 32 and the left hand ends of the motors. Thus, when fluid is delivered to the conduit 20 the pistons will move to the left as viewed in FIG. 6 causing exhaust of fluid through the conduit 32. Conversely, when fluid is supplied through conduit 32, the pistons will move back to the right from the dotted line position in FIG. 6 and cause exhaust of air through conduit 20.

During use of the system, the valve controlling spool is shifted from the position illustrated in FIG. 1 to the position illustrated in FIG. 4 so as to admit fluid under pressure to one end or the other of the motors 63 and 64, thus to reciprocate the tool.

When the valve spool is in the position of FIG. 1, fluid from the inlet 14 passes into the sleeve between the lands 55 and 56 and through the passage 17 in the direction of the solid arrow lines F, FIGS. 1 and 3. In this position of the valve, the passage communicating with conduit 32 is open to the exhaust port through passage 33 as indicated by the direction of the dotted line arrows R of FIG. 1. It should be noted that in this position of the valve, land 55 blocks communication between inlet passage 14 and passage 16 while land 56 blocks communication between exhaust passage 34 and the delivery and return passage 17. In this position of the valve, pressure builds up behind the right side of the pistons of FIG. 6 and since the space to the left of the pistons is open to exhaust through passage 33, the pistons and tool will be forced to the left. When it is desired to reverse the tool, the spool 13 is shifted to the right to the position shown in FIG. 4. The land 55 then blocks off communication between the passage 16 and exhaust passage 33 while the space between land 55 and end collar 52 is open to passage 17 and exhaust passage 34 through their associated grooves. In this position, the space between lands 55 and 56 is open to both the inlet passage 14 and passage 16 through their associated grooves and apertures in the sleeve, and hence air under pressure follows the path of the solid arrow RR in FIG. 4. Since conduit 32 thus conducts air under pressure, pressure develops behind the left side of the pistons of FIG. 6 and forces them to the right as viewed from the dotted line position in FIG. 6. Conduit 20 is in communication with passage 17, FIG. 4, which in turn is in communication with exhaust passage 34. Hence, air being exhausted from the cylinders 63 and 64 follows the path of the dashed arrows EL in FIGS. 4, 5 and 2.

If the operator desires an extremely fast forward stroke, needle valve 22 is moved outwardly from the passage 21 so as to provide a minimum restriction to the flow of air to conduit 20. The needle valve for passage 33 is also adjusted to provide a minimum impedance to the exhaust of air therethrough as returned by the passage 16.

For slower forward speeds, either the needle valve 22 or needle valve for passage 33, or both, may be adjusted for greater restricting effects to restrict both the exhaust of air from the cylinders as well as the flow of air thereto. Under some conditions of loading, it may be desirable to attain slower than maximum forward speeds by having the air delivery needle valve wide open or with minimum restricting effect, while the exhaust needle valve is adjusted for maximum restricting effect. The converse may be true for other conditions of load.

The speed of the return stroke may be similarly adjusted from maximum speed to minimum and to varied speeds therebetween by similarly adjusting the needle valve for passage 16 and needle valve for exhaust passage 34.

Since each air delivery and return passage is regulated independently of the other, any selected forward speed may be combined with any selected return speed in accordance with optimum operating conditions for a particular load considered in respect of the particular kind of work piece to be turned out by the machine tool.

By using the bypass and check valve for each of the delivery and return passages 16 and 17, the flow of air through these passages is subject to a selected regulatory action when used to deliver air to the motor and when used to exhaust air therefrom, each such regulatory action being effective only for that portion of the cycle for which it is intended.

I claim:

1. A control valve for a fluid control system for a reciprocatory machine tool of the kind in which fluid power means are effective to reciprocate a tool, said control valve having a fluid delivery and return passage leading therethrough to said power means, a fluid supply passage and an exhaust port selectively communicable with said delivery and return passage, a valve control element in said valve movable to selectively communicate the delivery and return passage with one of the fluid supply passages and exhaust port, selectively restrictable means associated respectively with said exhaust port and said delivery and return passage so as to vary both the rate of fluid return to the exhaust passage and the rate of fluid flow through said delivery passage to said fluid power means, passage means bypassing said restrictable means for said delivery passage and delivering fluid to said exhaust port, and means including a check valve for closing said bypass during delivery of fluid through said delivery and return passage to said fluid power means and for opening said bypass automatically as an incident to fluid pressure when fluid is to be returned from said power means.

2. A fluid control system as set forth in claim 1 characterized by and including a second fluid delivery and return passage leading through said control valve to said fluid power means, said second passage also having an exhaust port, restrictable means, and bypass and check valve means associated therewith in the same manner as the association with said first named passage, one of said delivery and return passages being in communication with its exhaust port and the other being in communication with said supply passage when said valve element is moved to one position and vice versa when said valve element is moved to another position.

3. A control valve for a fluid control system for reciprocatory tools of the kind in which the fluid control sysis effective to vary the speed of both the forward and return strokes of a reversible fluid motor connected to reciprocate a tool, said control valve having a pair of fluid delivery and return passages therein, a fluid supply and an exhaust port associated with each passage, a valve control element formed and adapted when moved to one position to establish communication between said supply and one passage while establishing communication between the other passage and its exhaust port and vice versa when moved to another position whereby one passage acts as a fluid supply to drive said motor while the other acts as an exhaust for said motor, selectively restrictable means associated with each exhaust port for selectively impeding the exhaust of fluid therethrough and thereby selectively impeding the speed of said motor in each direction of movement, selectively restrictable means associated with each passage at a point between the fluid motor means and the point of communication between the fluid supply and the respective passage so as to selectively vary the power supplied to the motor when any individual passage acts as a supply passage, and means bypassing the second-named restrictable means for each passage and including a normally closed check valve that is automatically operative under the pressure of return fluid when a passage acts as a return passage to open the bypass wide, whereby said first-named restrictable means for the exhaust port for one passage and said second-named restrictable means for the other passage cooperate in regulating speed.

4. A fluid system as set forth in claim 3 wherein each restrictable means includes an adjustable needle valve.

5. A control valve of the solenoid operated type including a valve block having a bore therein, a sleeve fitted in said bore, said sleeve having a plurality of spaced, circumferentially extending grooves formed in the outer surface thereof and at least one aperture affording communication between each groove and the interior of the sleeve, a centrally positioned one of said grooves being aligned with and in communication with a fluid inlet passage formed in said block, one pair of said grooves being aligned with and in communication with fluid delivery and return passages formed in said block, another pair of grooves being in communication with a pair of exhaust passages formed in said block, variable restricting means in each of said fluid delivery and return passages for regulating the flow of fluid therethrough, by-pass passages by-passing the variable restricting means, check valve means for permitting only unidirectional flow through said by-pass passages, and valve controlling means in said sleeve, said controlling means being formed and adapted to selectively establish communication between said inlet and one of the delivery and return passages at a time while establishing communication between an exhaust passage and the other of said delivery and return passages, the communication so established being through the apertures of the grooves associated with said passages.

6. A control valve as set forth in claim 5 wherein portions of said delivery and return passages are parallel to said inlet passage and aligned with plugged passages in the block, said plugged passages being positioned adjacent said inlet passage, and wherein said exhaust passages are inclined outwardly from said sleeve and have axes extending through enlarged bores in one side of said valve block.

7. A control valve as defined in claim 5 including additional variable restricting means in each of said exhaust passages and effective to regulate the flow of fluid through said by-pass passages.

8. A control valve of the solenoid operated type including a valve block and a pair of fluid delivery and return passages in said block, control means establishing communication between one passage and a source of fluid under pressure while establishing communication between the other passage and an exhaust port, said control means being reversible to establish communication between the other passage and said source while establishing communication between said one passage and an exhaust, each such passage having a variable restricting means associated therewith so as to regulate the delivery of fluid therethrough, a bypass for each passage allowing free return of fluid through said passage without restriction by said restricting means, each such bypass including a ball check valve adapted to close the bypass when fluid is delivered through its associated passage and adapted to open the bypass in response to return flow of fluid through its associated passage, and additional means for variably restricting the return of fluid from each passage.

9. A control valve as set forth in claim 8 wherein each passage includes parallel portions and a cross passage between said portions, and wherein each of said variable restricting means includes a needle valve adapted to selectively restrict the flow of fluid therepast.

References Cited in the file of this patent

UNITED STATES PATENTS

| | | |
|---|---|---|
| 1,105,061 | Carpenter | July 28, 1914 |
| 2,016,878 | Vickers | Oct. 8, 1935 |
| 2,055,530 | Hallenbeck | Sept. 29, 1936 |
| 2,364,864 | Martin | Dec. 12, 1944 |
| 2,450,481 | May | Oct. 5, 1948 |
| 2,652,732 | Frye | Sept. 22, 1953 |
| 2,765,378 | Perry | Oct. 2, 1956 |
| 2,765,808 | Tydeman | Oct. 9, 1956 |
| 2,781,996 | Smallpeice | Feb. 19, 1957 |
| 2,786,454 | Bertsch | Mar. 26, 1957 |
| 2,849,986 | Klopp | Sept. 2, 1958 |
| 2,889,815 | Lloyd | June 9, 1959 |

FOREIGN PATENTS

| | | |
|---|---|---|
| 11,639 | Great Britain | May 23, 1898 |